United States Patent [19]
Roy

[11] 3,855,234
[45] Dec. 17, 1974

[54] MANUFACTURE OF TETRAMISOLE
[75] Inventor: Thomas Paterson Roy, Macclesfield, England
[73] Assignee: Imperial Chemical Industries Limited, London, England
[22] Filed: June 12, 1972
[21] Appl. No.: 261,992

[30] Foreign Application Priority Data
July 9, 1971    Great Britain..................... 32330/71
Apr. 6, 1972    Great Britain..................... 15849/72

[52] U.S. Cl. ... 260/306.7 T, 260/239 E, 260/501.1, 260/570.6, 260/570.8 R
[51] Int. Cl............................................. C07d 99/10
[58] Field of Search .......... 260/239 E, 570.6, 306.7, 260/306.7 T, 501.1

[56]            References Cited
         UNITED STATES PATENTS
3,463,784    8/1969    Doyle et al. ..................... 260/306.7
      FOREIGN PATENTS OR APPLICATIONS
1,005,023    9/1965    Great Britain................... 260/570.6
              OTHER PUBLICATIONS
Wagner et al., Synthetic Organic Chemistry, N.Y., John Wiley & Sons, 1953, pp. 170-171.

*Primary Examiner*—Richard J. Gallagher
*Attorney, Agent, or Firm*—Cushman, Darby & Cushman

[57]            ABSTRACT

Process for the manufacture of N-(2-halogenoethyl)-N-(2-hydroxy-2-phenylethyl)amines, known intermediates in manufacture of the anthelmintic tetramisole. In one alternative, process comprises reacting N-(2-hydroxyethyl)-N-(2-hydroxy-2-phenylethyl)amine with a halogenating agent, e.g., thionyl chloride, to give N-(2-halogenoethyl)-N-(2-halogeno-2-phenylethyl)amine salt, and reacting latter compound with water to give said monohalogeno compound. In another alternative, the isomeric N-(2-hydroxyethyl)-N-(2-hydroxy-1-phenylethyl)amine is reacted with halogenating agent to give N-(2-halogenoethyl)-N-(2-halogeno-1-phenylethyl)amine derivative, and reaction of latter with water gives said monohalogeno derivative. In another alternative, a mixture of the two said dihydroxy compounds is used as starting material. Conversion of the two dihalogeno derivatives to the same monohalogeno derivative proceeds, apart from exceptional circumstance, via an aziridine derivative.

11 Claims, No Drawings

MANUFACTURE OF TETRAMISOLE

This invention relates to the manufacture of intermediates which are useful in the manufacture of tetramisole and acid-addition salts thereof, and more paticularly it relates to a new multi-step process for the manufacture of the said intermediates, to processes for the manufacture of compounds (themselves intermediates) used in the said multi-step process, and to those of the said compounds which are new compounds.

Tetramisole, i.e., dl-2,3,5,6-tetrahydro-6-phenylimidazo[2,1-b]thiazole, and its pharmaceutically-acceptable acid-addition salts, and the corresponding laevorotatory compounds, are well known to be useful as anthelmintic agents. It is known to manufacture tetramisole and pharmaceutically-acceptable acid-addition salts thereof by a process which comprises ring-closing an acid-addition salt of 2-imino-3-(2-hydroxy-2-phenylethyl)thiazolidine (this base is hereinafter called IHPT; it has the formula X below). It is also known to manufacture IHPT and acid-addition salts thereof by reacting thiourea or thiocyanic acid with a compound of the formula:

PhCHOHCH$_2$NHCH$_2$CH$_2$W HW

I wherein Ph stands for an unsubstituted phenyl radical and W stands for a halogen atom, for example a bromine or chlorine atom, or a radical of the formula —O.SO$_2$.R, wherein R stands for a phenyl or tolyl radical.

The subject of this invention is a new multi-step process for the manufacture of IHPT and tetramisole and acid-addition salts thereof, and new processes for the manufacture of intermediate compounds used in the said multi-step process. For ease of understanding, the relationship between the various processes and products of this invention will first be illustrated in summary form:

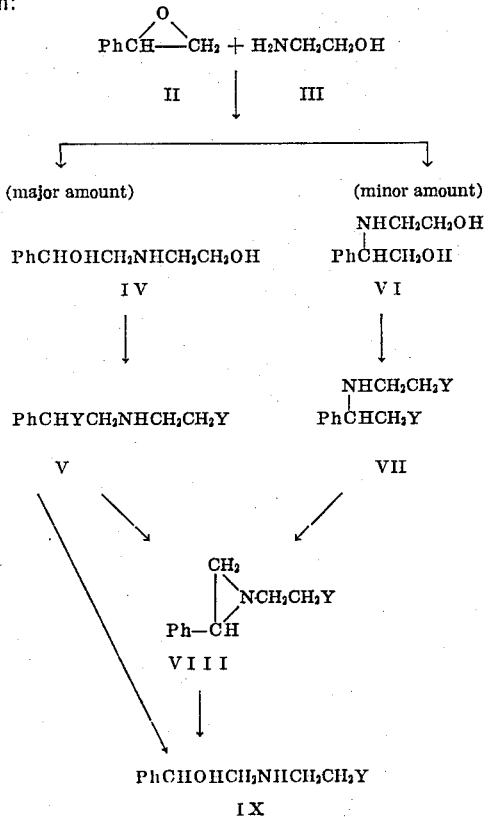

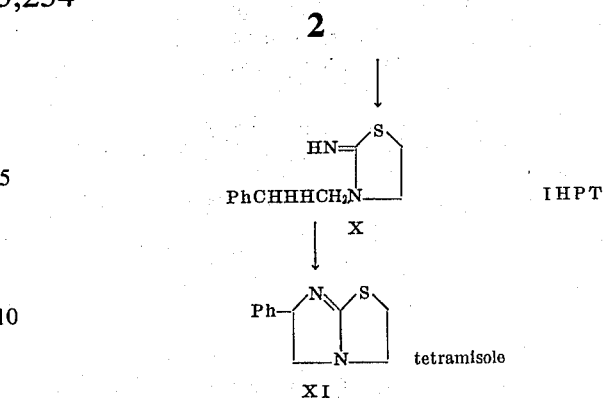

The intermediates of the formula IV and VI (the latter and its acid-addition salts being new compounds, and being provided as one feature of this invention) are obtained by reacting styrene oxide (II) with ethanolamine (III) at about 60°C. for about 3 hours. This reaction givs a mixture of isomeric products; i.e., a major amount (of the order of 70 percent by weight when a large excess of ethanolamine is used) of N-(2-hydroxyethyl)-N-(2-hydroxy-2-phenylethyl)amine (IV), and a minor amount (of the order of 20 percent by weight) of N-(2-hydroxyethyl)-N-(2-hydroxy-1-phenylethyl)amine (VI). This mixture can be separated by known means, if desired. The present invention provides processes whereby both isomers, i.e., IV and VI, can be used as intermediates in the manufacture of the desired products.

According to one feature of the invention there are provided compounds of the formula:

V wherein Ph has the meaning stated above, Y stands for a halogen atom, H$_n$Z stands for an acid, and Z is an anion of valency $n$.

Suitable values for Y are, for example, a chlorine or bromine atom. A suitable value for H$_n$Z is, for example, a relatively strong acid, for example a hydrogen halide, for example hydrochloric or hydrobromic acid, or sulphuric, phosphoric, perchloric or p-toluenesulphonic acid. Specific compounds of the formula V are, for example, N-(2-chloroethyl)-N-(2-chloro-2-phenylethyl)ammonium chloride and N-(2-bromoethyl)-N-(2-bromo-2-phenylethyl)ammonium p-toluenesulphonate. It is to be noted that the free bases corresponding to the acid-addition salt of the formula V are unstable.

According to a further feature of the invention there is provided a process for the manufacture of compounds of the formula V, wherein Ph, Y, Z and $n$ have the meanings stated above, which comprises reacting the compound of the formula IV, wherein Ph has the meaning stated above, or an acid-addition salt thereof, with a reactant selected from SOY$_2$, SO$_2$Cl$_2$, PY$_3$, POY$_3$ and PY$_5$, wherein Y has the meaning stated above.

Suitable acid-addition salts for use in this process are those derived from the acids mentioned above in the context of the compound of the formula V, or derived from a C$_{2-6}$ alkanoic acid, for example acetic acid.

A suitable reactant is, for examle, thionyl chloride, sulphuryl chloride, phosphorus trichloride,, phosphorus tribromide, phosphorus oxychloride or phosphorous pentachloride. The reaction may optionally be carried out in an organic solvent, for example an unsubstituted or substituted aromatic hydrocarbon, for example toluene, xylene or chlorobenzene, or a halogenated $C_{1-3}$ alkane, for example ethylene dichloride. The reaction may be carried out at room temperature or at a moderately elevated temperature,, for example between about 20°C and 60°C.

According to a further feature of the invention there are provided compounds of the formula:

VII wherein Ph and Y have the meanings stated above, and acid-addition salts thereof.

Suitable values for Y are, for example, a chlorine or bromine atom. Suitable acid-addition salts are, for example, derived from a hydrogen halide, for example hydrogen chloride or hydrogen bromide, or sulphuric, phosphoric, perchloric, p-toluenesulphonic or acetic acid. It is to be noted that the free bases of the formula VII are more stable than the free bases corresponding to the acid addition salt of the formula V.

A specific compound of the formula VII is, for example, N-(2-chloroethyl)-N-(2-chloro-1-phenylethyl)ammonium chloride.

According to a further feature of the invention there is provided a process for the manufacture of compounds of the formula VII, wherein Ph and Y have the meanings stated above, and acid-addition salts thereof, which comprises reacting the compound of the formula VI, wherein Ph has the meaning stated above, or an acid-addition salt thereof, with a reactant selected from $SOY_2$, $SO_2Cl_2$, $PY_3$, $POY_3$ and $PY_5$, wherein Y has the meaning stated above.

Suitable acid-addition salts of the compound of the formula VI, and suitable reactants, organic solvents and reaction conditions are those described above in respect of the analogous process involving the isomeric compound of the formula IV.

According to a further feature of the invention there are provided compounds of the formula:

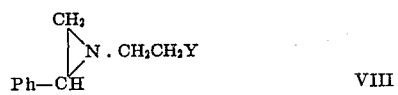
VIII wherein Ph and Y have the meaning stated above.

Specific compounds of the formula VIII are, for example, N-(2-chloroethyl)-2-phenylaziridine and N-(2-bromoethyl)-2-phenylaziridine.

According to a further feature of the invention there is provided a process for the manufacture of compounds of the formula VIII, wherein Ph and Y have the meanings stated above, which comprises reacting a compound of the formula V, or a compound of the formula VII or an acid-addition salt thereof, wherein Ph, Y, Z and n have the meanings stated above, with a base.

As a suitable base there may be mentioned an inorganic base, for example an alkali metal hydroxide, carbonate or bicarbonate, for example sodium or potassium hydroxide, or sodium carbonate or sodium bicarbonate. The reaction is conveniently carried out in a solvent, for example water, or a $C_{1-5}$ alkanol, for example isopropanol, or a mixture thereof. The reaction may be carried out between room temperature and about 100°C., for example under reflux.

According to a further feature of the invention there is provided a process for the manufacture of compounds of the formula:

$$PhCHOHCH_2NHCH_2CH_2Y$$
IX wherein Ph and Y have the meanings stated above, and acid-addition salts thereof, which comprises reacting a compound of the formula:

$$PhCHYCH_2NHCH_2CH_2Y \cdot H_nZ$$
V or

VII (or an acid-addition salt thereof) or

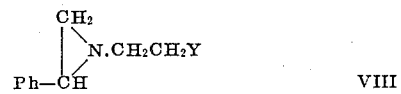
VIII wherein Ph, Y, Z and $n$ have the meanings stated above, with water, in the presence of an acid (in the case of the compound of the formula VIII), or optionally in the presence of an acid (in the case of the compounds of the formulae V and VII).

Salts of the compound of the formula IX which may be obtained by this process may be derived from an inorganic acid, for example hydrogen chloride, hydrogen bromide or sulphuric or phosphoric acid, or an organic acid, for example p-toluenesulphonic acid or acetic acid.

As indicated, the presence of an acid is obligatory in the case where a starting material of the formula VIII is used. A suitable acid is, for example, a relatively strong acid, for example a hydrohalic acid, for example hydrochloric or hydrobromic acid, or sulphuric, phosphoric, perchloric or p-toluenesulphonic acid, or a $C_{2-6}$ alkanoic acid, for example acetic acid. On the other hand, the presence of an added acid is only an optional feature in the case where a starting material of the formula V or VII is used. With the proviso noted below as regards the former starting material (i.e., V) under strongly acidic conditions, both of the starting materials V and VII are first converted into the compound of the formula VIII, and at first sight it may seem puzzling that added acid is not obligatory in the case of said starting material of the formula V or VII, whereas it is obligatory in the case of the common intermediate of the formula VIII. The explanation of the apparent anomaly is that in the case of starting materials of the formula V or VII the reaction mixture is sufficiently acidic to cause the conversion of the intermediate of the formula VIII into the product of the formula IX to proceed. More particularly, when the starting material is a free base of the formula VII, acid of the formula HY is generated during the reaction, and this acid is sufficient to cause the intermediate of the formula VIII to be converted into the product of the formula IX. When the starting material is either a salt of the formula V or a salt of the formula VII, the salt itself is acidic in nature and so renders the reaction mixture acidic, and in addition, acid of the formula HY is generated during the reaction, as discussed in the analogous case of a free base of the formula VII.

However, as indicated above, as an optional feature an acid can be added in the case of the starting material of the formula V or VII. Suitable acids are those mentioned above in the context of the starting material of the formula VIII. When the starting material is of the formula V and strongly acidic conditions are usedc, it is believed that the direct hydrolysis route (i.e., V to IX) is followed as well as the indirect route (i.e., V to VIII to IX), and that, if the acidity is increased, this direct route becomes progressively more important compared with the indirect route. In the case where the starting material is a base (or acid-addition salt) of the formula VII, the reaction should be carried out at a pH of 1 to 5, and more particularly 2 to 2.5. The pH of the reaction mixture is kept in this range by the periodic addition of an inorganic base, for example sodium hydroxide.

The last-named general process may optionally be carried out in the presence of an organic solvent, for example a $C_{1-5}$ alkanol, for example ethanol or isopropanol. Furthermore, the reaction may be carried out at a temperature from room temperature to a moderately elevated temperature, for example under reflux.

According to a further feature of this invention there is provided a multi-step process for the manufacture of IHPT and acid-addition salts thereof. It is to be understood that there is no necessity in this multi-step process to separate the mixture of isomers of the formulae IV and VI prior to carrying out the next stage, i.e., the conversion into the compounds of the formulae V and VII. This is because the same compound, i.e., IX, is ultimately obtained from both isomers. On the other hand, if it is deemed necessary, for any reason, the mixture of isomers of the formulae IV and VI can be separated by known means, and the subsequent steps carried out on the individual isomers. Accordingly, it is to be understood that the multi-step process described below comprises the use as intermediates of:

a. the compound of the formula IV or an acid-addition salt thereof; or
b. the compound of the formula VI or an acid-addition salt thereof; or
c. a mixture of compounds of the formulae IV and VI, or acid-addition salts thereof.

As indicated above, however, for reasons of economy processes of the type (c) are preferred.

According to a further feature of the invention there is provided a multi-step process for the manufacture of IHPT and acid-addition salts thereof, which comprises reacting the compound of the formula IV or VI, wherein Ph has the meaning stated above, or an acid-addition salt thereof, or a mixture of said compounds or said salts, with a reactant selected from $SOY_2$, $SO_2Cl_2$, $PY_3$, $POY_3$ and $PY_5$, wherein Y has the meaning stated above, and then reacting the product (a compound of the formula V or VII, or an acid-addition salt thereof, or a mixture of the said compoounds or salts) with water, optionally in the presence of an acid, and then reacting the product of the formula IX, or an acid-addition salt thereof, with thiourea or thiocyanic acid in known manner. An important feature of this multi-step process is that it is not necessary to isolate any of the intermediates. It is to be understood that the various reactants, solvents and reaction temperatures which are mentioned in more detail above in the context of the corresponding single-step processes can be used *mutatis mutandis* in the said multi-step process.

In one preferred embodiment of this invention Y stands for a chlorine atom, the said reactant is thionyl chloride, and the IHPT is obtained as the p-toluenesulphonate. It is to be understood that, so far as it is relevant, this preferred embodiment applies either to single-step processes, for example the above process for making a compound of the formula V or VII, or to multi-step processes, for example the above multi-step process for making IHPT and acid-addition salts thereof.

The invention is illustrated by the following Examples:

EXAMPLE 1

A stirred solution of N-(2-hydroxyethyl)-N-(2-hydroxy-2-phenylethyl)amine (25g.) in toluene (150ml.) at 45°C. was saturated with hydrogen chloride gas. Thionyl chloride (21ml.) was then added all at once, and the reaction solution was stirred at 45°C. for 3 hours. The reaction mixture was filtered, the solid residue dried in vacuo, and crystallised from ethanol to give N-(2-chloroethyl)-N-(2-chloro-2-phenylethyl)ammonium chloride, m.p. 164°–165°C.

EXAMPLE 2

A solution of the dichloro compound described in Example 1 (20g.) in water (200ml.) was refluxed for 2 hours. The solution was cooled, basified to pH 10 with 2N-sodium hydroxide, and extracted with chloroform (3 × 20ml.). The combined extracts were concentrated in vacuo and saturated with gaseous hydrogen chloride to give N-(2-chloroethyl)-N-(2-hydroxy-2-phenylethyl)ammonium chloride, m.p.158°–159°C.

EXAMPLE 3

N-(2-Chloroethyl)-N-(2-chloro-2-phenylethyl)ammonium chloride (15g.) was dissolved in water (300ml.) and the solution was stirred at 20°C. for 3weeks. The solution was basified to pH 10 with 2N-sodium hydroxide, and extracted with chloroform (3 × 20ml.). The combined extracts were concentrated in vacuo and saturated with gaseous hydrogen chloride to give N-(2-chloroethyl)-N-(2-hydroxy-2-phenylethyl)ammonium chloride, m.p.158°–159°C.

EXAMPLE 4

N-(2-Chloroethyl)-N-(2-chloro-2-phenylethyl)ammonium chloride (30g.) was refluxed with water (200 ml.) for 2 hours. The resulting solution contained N-(2-chloroethyl)-N-(2-hydroxy-2-phenylethyl)ammonium chloride. Thiourea (9g.) was added to this solution, and the mixture was refluxed for 24 hours. p-Toluenesulphonic acid (22.5g.) was then added to the hot stirred solution, and the resulting solution was cooled. The resulting mixture was filtered, and the solid residue was washed with acetone (100ml.) and then dried in vacuo at 70°C. There was thus obtained 2-imino-3-(2- hydroxy-2-phenylethyl)thiazolidinium p-toluenesulphonate, m.p.242°-244°C.

EXAMPLE 5

A stirred suspension of N-(2-hydroxyethyl)-N-(2-hydroxy-2-phenylethyl)amine (25g.) in toluene (150ml.) at 45°C. was saturated with hydrogen chloride gas. Thionyl chloride (21ml.) was added all at once, and the solution was stirred at 45°C. for 3 hours. The resulting suspension contained N-(2-chloroethyl)-N-(2-chloro-2-phenylethyl)ammonium chloride. Water (220ml.) was added to the suspension, and the mixture was stirred and heated under reflux for 3 hours. The mixture was separated, and the aqueous phase was adjusted to pH 2 with sodium hydroxide (100°Tw). The resulting solution contained N-(2-chloroethyl)-N-(2-hydroxy-2-phenylethyl)ammonium chloride. Thiourea (11g.) was added to the solution, and the resulting solution was refluxed for 24 hours. p-Toluenesulphonic acid (27g.) was then added to the hot stirred solution, the resulting solution was cooled and the resulting mixture filtered. The solid residue was washed with acetone (100ml.) and then dried in vacuo at 70°C., to give 2-imino-3-(2-hydroxy-2-phenylethyl)thiazolidinium p-toluenesulphonate, m.p.242°-244°C.

EXAMPLE 6

A stirred suspension of N-(2-hydroxyethyl)-N-(2-hydroxy-1-phenylethyl)amine (25g.) in toluene (150ml.) at 40°C. was saturated with hydrogen chloride gas. Thionyl chloride (21ml.) was then added all at once, and the resulting solution was stirred at 45°C. for 4 hours. The reaction mixture was filtered, the solid residue dried at 70°C. in vacuo, and crystallised from isopropanol to give N-(2-chloroethyl)-N-(2-chloro-1-phenylethyl)-ammonium chloride, m.p.152°-154°C.

The starting material was obtained as follows:

Styrene oxide (50g.) was added over 2 hours to stirred ethanolamine (152g.) at 60°C., and the solution stirred at 60°C. for a further 1 hour. The excess ethanolamine was distilled off by heating the solution up to 140°C in vacuo (20mm Hg.). Toluene (100ml.) was then added to the residue, the hot solution was cooled to 30°C., and the precipitated N-(2-hydroxyethyl)-N-(2-hydroxy-2-phenylethyl)amine, m.p.95°-97°C., was filtered off. The filtrate was cooled to 0°C., and gave N-(2-hydroxyethyl)-N-(2-hydroxy-1-phenylethyl)amine as a white solid, which was crystallised from toluene, and then had m.p.66°-68°C.

EXAMPLE 7

A solution of N-(2-chloroethyl)-N-(2-chloro-1-phenylethyl)ammonium chloride (5g.) in water (150ml.) was refluxed for 2 hours. During this time the pH of the reaction mixture was kept at 2.0-2.5 by periodic (every 2 minutes) additions of 18N-sodium hydroxide. The solution was then basified to pH 10 with 2N-sodium hydroxide, and extracted with chloroform (2 × 25ml.). The combined extracts were dried (MgSO$_4$) and then saturated with gaseous hydrogen chloride to give N-(2-chloroethyl)-N-(2-hydroxy-2-phenylethyl)ammonium chloride, m.p.158°-159°C.

EXAMPLE 8

A stirred suspension of N-(2-hydroxyethyl)-N-(2-hydroxy-1-phenylethyl)amine (10.5g.) in toluene (70ml.) at 45°C. was saturated with hydrogen chloride gas. Thionyl chloride (9.5ml.) was then added all at once, and the rsulting solution was stirred at 40°C. for 5 hours. The resulting suspension contained N-(2-chloroethyl)-N-(2-chloro-1-phenylethyl)ammonium chloride. Water (50ml.) was added to the suspension, and the mixture was stirred and heated to 70°C. The mixture was then separated; the aqueous phase contained N-(2-chloroethyl)-N-(2-chloro-1-phenylethyl)-ammonium chloride. This aqueous solution was then adjusted to pH 2.0 with 18N-sodium hydroxide and refluxed for 2 hours, keeping the pH at 2.0-2.5 by periodic additions of 18N-sodium hydroxide. The solution was then cooled to 60°C., the pH adjusted to 1.0 with 12N-hydrochloric acid, thiourea (6.6g.) added, and the solution refluxed for 10 hours. p-Toluenesulphonic acid (11g.) was then added to the hot stirred solution, the resulting solution was cooled and the resulting mixture filtered. The solid residue was washed with acetone (20ml.) and then dried in vacuo at 70°C., to give 2-imino-3-(2-hydroxy-2-phenylethyl)-thiazolidinium p-toluenesulphonate, m.p.242°-244°C.

EXAMPLE 9

Styrene oxide (50g.) was added over 2 hours to stirred ethanolamine (460g.) at 60°C., and the solution was stirred at 60°C. for a further 1 hour. The excess ethanolamine was distilled off by heating the solution up to 140°C. in vacuo (20mm Hg.). The resulting melt consisted of N-(2-hydroxyethyl)-N-(2-hydroxy-2-phenylethyl)amine (80% w/w) and N-(2-hydroxyethyl)-N-(2-hydroxy-1-phenylethyl)amine (20% w/w). Toluene (400ml.) was then added,, and the solution was stirred and cooled to 40°C. and then saturated with hydrogen chloride gas. Thionyl chloride (69ml.) was added all at once, and the solution was stirred at 45°C. for 4 hours. The resulting solution contained N-(2-chloroethyl)-N-(2-chloro-2-phenylethyl)ammonium chloride and N-(2-chloroethyl)-N-(2-chloro-1-phenylethyl)ammonium chloride. Water (380ml.) was added to the solution, and the stirred mixture was heated to 70°C. The mixture was separated, and the aqueous phase was adjusted to pH 2 by the addition of 18N sodium hydroxide and then refluxed for 2 hours. During this time the pH of the reaction mixture was kept at 2.0-2.5 by periodic (every 2 minutes) additions of 18N sodium hydroxide. The solution was then cooled to 60°C., the pH adjusted to 1.0 with 12N-hydrochloric acid, thiourea (47g.) was added, and the solution was refluxed for 10 hours. p-Toluenesulphonic acid (79g.) was then added to the hot stirred solution, the resulting solution cooled and the resulting mixture filtered. The solid residue was washed with acetone (350ml.) and then dried in vacuo at 70°C., to give 2-imino-3-(2-hydroxy-2-phenylethyl)thiazolidinium p-toluenesulpnonate, m.p. 242°-244°C.

EXAMPLE 10

Chloroform (25ml.) was added to a solution of N-(2-chloroethyl)-N-(2-chloro-2-phenylethyl)ammonium chloride (1.0g.) in water (25ml.). The mixture was stirred and adjusted to pH 10 by the addition of 2N sodium hydroxide (3.5ml.) all at once. Stirring at room temperature was continued for 30 minutes, and the organic phase was then separated, washed with water (2 × 10ml.), dried (MgSO$_4$) and evaporated in vacuo at 50°C. to give N-(2-chloroethyl)-2-phenylaziridine as a pale yellow oil, n.m.r. (CDCl₃)τ 2.75 (5H, s, aromatic H), 6.31 (2H, t, J=6.5Hz,—CH₂—Cl), 7.28 (2H, t, J=6.5Hz,

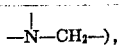

7.60 (1H, dd, J₁=7.0, J₂=3.5Hz,

8.18 (1H, d,

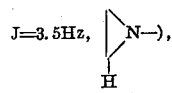

8.26 (1H, d,

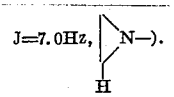

EXAMPLE 11

A solution of N-(2-chloroethyl)-2-phenylaziridine (0.5g.) in ethanol (5ml.) was added dropwise over one-half hour to a stirred solution of 0.1N hydrochloric acid (30ml.) at 60°C. The aqueous solution after stirring a further 10 minutes was cooled to room temperature, basified to pH 11 with 18N sodium hydroxide, and extracted with chloroform (2 × 15ml.). The organic solution was dried (MgSO₄), and saturated with gaseous hydrogen chloride to give N—(2-chloroethyl)-n-(2-hydroxy-2-phenylethyl)ammonium chloride, m.p.158°–159°C.

EXAMPLE 12

To a stirred solution of N-(2-hydroxyethyl)-N-(2-hydroxy-2-phenylethyl)amine (20g.) in toluene (120ml.) at 45°C. was added p-toluenesulphonic acid (21g.). Phosphorus tribromide (34.2g.) was added over 15 minutes to the stirred solution, which was then held at 45°C. for a further 8 hours. The mixture was separated and the lower layer was dissolved in refluxing methanol (40ml.). The solution was cooled to 0°C., the resulting mixture was then filtered, and the solid residue was dried in vacuo and was N—(2-bromoethyl)—N—(2-bromo-2-phenylethyl)ammonium p-toluenesulphonate, m.p.142—143°C.

EXAMPLE 13

The process described in Example 1 was repeated except that phosphorus oxychloride (14.7g.) was used instead of the thionyl chloride. There was thus obtained the same product, m.p.164°–165°C.

EXAMPLE 14

The processes described in Example 5 were repeated except that either phosphorus trichloride (13.2g.), phosphorus pentachloride (12.1g.) or sulphuryl chloride (19.5g.) was used instead of the thionyl chloride. There was thus obtained 2-imino-3-(2-hydroxy-2-phenylethyl)thiazolidinium p-toluenesulphonate, m.p.242°–244°C.

EXAMPLE 15

The process described in Example 1 was repeated except that chlorobenzene (150ml.) or ethylene dichloride (150ml.) was used as the solvent instead of the toluene. There was thus obtained the same product, m.p.164°–165°C.

EXAMPLE 16

Concentrated sulphuric acid (6.98g.) was added over 10 minutes to a stirred suspension of N—(2-hydroxyethyl)—N—(2-hydroxy-2-phenylethyl)amine (25g.) in toluene (100ml.) at 25°C. Thionyl chloride (22ml.) was then added all at once, and the stirred solution was heated at 45°C. for 4 hours. After addition of water (220ml.), the process was carried on as described in Example 5. There was thus obtained 2-imino-3-(2-hydroxy-2-phenylethyl)thiazolidinium p-toluenesulphonate, m.p.242°–244°C.

These processes were repeated except that the sulphuric acid was replaced by acetic acid (6.96g.); the same product, m.p.242°–244°C., was obtained.

EXAMPLE 17

Perchloric acid (19.45g.; d. 1.70g./ml.) was added over 15 minutes to a stirred suspension of N-(2-hydroxyethyl)-N-(2-hydroxy-2-phenylethyl)amine (25g.) in toluene (150ml.) at 25°C. The solution was then heated to reflux and the water removed (as an azeotrope) using a Dean and Stark apparatus. The solution was then treated at 45°C. with thionyl chloride (21ml.), and the process continued as described in Example 5. There was thus obtained 2-imino-3-(2-hydroxy-2-phenylethyl)thiazolidinium p-toluenesulphonate, m.p.242°–244°C.

These processes were repeated except that hydrobromic acid (23.3g.; 48–50% v/v, d. 1.51g./ml.) was used instead of perchloric acid. The same product, m.p.242°–244°C., was obtained.

EXAMPLE 18

0.25N-sodium hydroxide (13ml.) was added over 10 minutes to a stirred solution of N-(2-bromoethyl)-N-(2-bromo-2phenylethyl)ammonium p-toluenesulphonate (0.7g.) in ethanol (20ml.), and the solution was stirred at room temperature for 2 hours. The solution was then diluted with water (50ml.) and extracted with chloroform (2 × 15ml.). The organic phase was washed with water (2 × 10ml.) and dried (MgSO₄), and then evaporated in vacuo at 50°C. to give N-(2-bromoethyl)-2-phenylaziridine as a pale yellow oil, n.m.r. (CDCl₃) τ 2.80 (5H, s, aromatic H), 6.50 (2H, t, J=7.0Hz, —CH₂—Br), 7.22 (2H, t, J=7.0Hz,

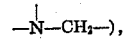

7.59 (1H, dd, J=3.5Hz, J₂=7.0Hz,

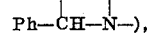

8.08 (1H, d,

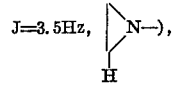

8.25 (1H, d, J=7.0Hz).

EXAMPLE 19

N-(2-bromoethyl)-2-phenylaziridine (2g.) was added dropwise over 30 minutes to a stirred solution of p-toluenesulphonic acid (4.0g.) in isopropanol (10ml.) and water (30ml.) at 40°C. After stirring for a further 2 hours at 40°C. the solution was cooled to 0°C. and the resulting mixture filtered. The solid residue was washed successively with water (10ml.) and acetone (20ml.) and then dried in vacuo at 50°C. to give N-(2-bromoethyl)-N-(2-hydroxy-2-phenylethyl)ammonium p-toluenesulphonate, m.p.145°–148°C.

EXAMPLE 20

The process described in Example 10 was repeated except that sodium bicarbonate (0.8g.) or sodium carbonate (0.45g.) was used instead of the sodium hydroxide. There was thus obtained N-(2-chloroethyl)-2-phenylaziridine having the same properties.

EXAMPLE 21

A stirred suspension of N-(2-hydroxyethyl)-N-(2-hydroxy-1-phenylethyl)amine (5g.) in toluene (40ml.) was saturated with hydrogen chloride gas. Phosphorus tribromide (8.4g.) was then added all at once, and the resulting suspension stirred at 45°C. for 8 hours. The resulting suspension contained a mixture of N-(2-bromoethyl)-N-(2-bromo-1-phenylethyl)ammonium chloride and the corresponding bromide. Water (50ml.) was added to the suspension and the mixture was stirred and heated to 40°C. The mixture was then evaporated; the aqueous phase contained a mixture of N-(2-bromoethyl)-N-(2-bromo-1-phenylethyl)ammonium chloride and the corresponding bromide. The aqueous solution was adjusted to pH 1.0 with 18N-sodium hydroxide and refluxed for 1 hour, keeping the pH at 1.0–1.5 by periodic additions of 18N sodium hydroxide. The solution was then basified to pH 10 with 18N sodium hydroxide, and extracted with chloroform (2 × 10ml.). The combined extracts were dried (MgSO₄) and then saturated with gaseous hydrogen chloride to give N-(2-bromoethyl)-N-(2-hydroxy-2-phenylethyl)ammonium chloride, m.p.143°–145°C.

EXAMPLE 22

A solution of N-(2-chloroethyl)-2-phenylaziridine (10g.) in isopropanol (20ml.) was added dropwise over 1 hour to a stirred solution of 1N-acetic acid (80ml.) at 50°C. After stirring the solution for a further 30 minutes, thiourea (3.1g.) was added, and the mixture was refluxed for 24 hours. p-Toluenesulphonic acid (10.5g.) was then added to the hot stirred solution, and the product, m.p.242°–244°C., was worked up as described in Example 4.

EXAMPLE 23

N-(2-chloroethyl)-N-(2-chloro-2-phenylethyl)ammonium chloride (10g.) was refluxed in a mixture of isopropanol (25ml.) and water (75ml.) for 8 hours. The solution was basified to ph 10 with 2N-sodium hydroxide, and extracted with chloroform (3 × 20ml.). The combined extracts were concentrated in vacuo and saturated with gaseous hydrogen chloride to give N-(2-chloroethyl)-N-(2-hydroxy-2-phenylethyl)-ammonium chloride, m.p.158°–159°C.

EXAMPLE 24

The process described in Example 2 was repeated, but, after the basification and extraction with chloroform (3 × 20ml.), the combined extracts were concentrated in vacuo, petroleum ether (b.p.60°–80°C.) was added, and the solution was cooled to 0°C. The resulting mixture was filtered, and the solid residue dried in vacuo at 40°C. to give N-(2-choroethyl)-N-(2-hydroxy-2-phenylethyl)amine, m.p.64°–66°C.

What we claim is:

1. In a process for the manufacture of a compound selected from the group consisting of tetramisole and 2-imino-3-(2-hydroxy-2-phenylethyl)-thiazolidine and acid-addition salts thereof, and involving the conversion of a compound of the formula:

$$PhCHOHCH_2NHCH_2CH_2Y \qquad IX$$

into the said 2-imino-thiazolidine derivative or an acid-addition salt thereof, and the optional conversion of the said 2-imino-thiazolidine derivative or an acid-addition salt thereof into tetramisole or an acid-addition salt thereof, the step which comprises reacting a compound which is selected from the group consisting of ethylamine derivatives of the formulae:

$$PhCHYCH_2NHCH_2CH_2Y \; H_nZ \qquad V$$

and

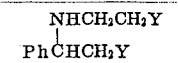

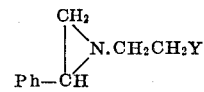

with water, and in the presence of an acid in the case of the compound of the formula VIII,, and wherein pH stands for phenyl, Y stands for a halogen atom, and $H_nZ$ stands for an acid wherein Z is an anion of valency $n$.

2. Process as claimed in claim 1 in which Y is a member selected from the group consisting of chlorine and bromine atoms.

3. Process as claimed in claim 1 which is carried out in a $C_{1-5}$ alkanol.

4. Process as claimed in claim 1 which is carried out at substantially reflux temperature.

5. Process as claimed in claim 1 involving a reactant of the formula V or VII, which process is carried out in the presence of an acid.

6. In a process for the manufacture of a compound which is a member selected from the group consisting of tetramisole and 2-imino-3-(2-hydroxy-2-phenylethyl)-thiazolidine and acid-addition salts thereof, the step which comprises reacting a ccompound which is a member selected from the group consisting of ethylamine derivatives of the formulae:

$$PhCHYCH_2NHCH_2CH_2Y \; H_nZ \qquad V$$

and

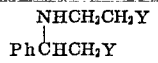

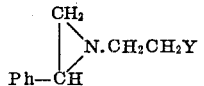

wherein Ph is phenyl, Y is halogen and $H_nZ$ stands for an acid, and acid-addition salts of the base of the formula VII, with water, and in the presence of an acid in the case of the compound of the formula VIII.

7. A process for the manufacture of compounds of the formula:

$$PhCHOHCHP_2NHCH_2CH_2Y \qquad IX$$

wherein Ph stands for phenyl and Y stands for a halogen atom, and acid-addition salts thereof, which comprises reacting a compound of the formula:

$$PhCHYCH_2NHCH_2CH_2Y \cdot H_nZ \qquad V$$

wherein Ph and Y have the meaning stated above and $H_nZ$ stands for an acid, with water in the presence of an acid.

8. Process as claimed in claim 7 in which Y is a member selected from the group consisting of chlorine and bromine atoms.

9. Process as claimed in claim 7 which is carried out in a $C_{1-5}$ alkanol.

10. Process as claimed in claim 7 which is carried out at substantially reflux temperature.

11. Process as claimed in claim 5 wherein the reactant is of the formula V.

* * * * *